United States Patent
Tran et al.

(10) Patent No.: US 8,896,146 B2
(45) Date of Patent: Nov. 25, 2014

(54) AUTOMOTIVE POWER SYSTEM

(75) Inventors: Tuyen Quoc Tran, Dearborn, MI (US); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1111 days.

(21) Appl. No.: 12/400,302

(22) Filed: Mar. 9, 2009

(65) Prior Publication Data

US 2010/0225164 A1 Sep. 9, 2010

(51) Int. Cl.
*B60L 1/00* (2006.01)
*H02M 3/335* (2006.01)
*B60L 11/18* (2006.01)
*B60R 16/03* (2006.01)
*H02J 7/00* (2006.01)

(52) U.S. Cl.
CPC ....... *H02J 7/0054* (2013.01); *H02J 2007/0059* (2013.01); *Y02T 10/7005* (2013.01); *Y02T 10/7011* (2013.01); *Y02T 10/7066* (2013.01); *Y02T 10/7016* (2013.01); *Y02T 10/7055* (2013.01); *H02M 3/33584* (2013.01); *H02J 7/0019* (2013.01); *B60L 11/1868* (2013.01); *B60R 16/0315* (2013.01)
USPC .................................................. 307/10.1

(58) Field of Classification Search
USPC ............ 307/9.1, 127, 138, 10.1; 320/118, 25, 320/FOR. 124, DIG. 15; 370/FOR. 136, 78; 363/63
See application file for complete search history.

(56) References Cited

U.S. PATENT DOCUMENTS

| | | | |
|---|---|---|---|
| 6,008,623 A | 12/1999 | Chen et al. | |
| 6,150,795 A | 11/2000 | Kutkut et al. | |
| 6,356,055 B1 | 3/2002 | Lin et al. | |
| 6,923,279 B2 * | 8/2005 | Shimane et al. | 180/65.1 |
| 7,245,108 B2 | 7/2007 | Chertok et al. | |
| 2005/0269988 A1 | 12/2005 | Thrap | |
| 2007/0279003 A1 | 12/2007 | Altemose et al. | |
| 2008/0211459 A1 | 9/2008 | Choi | |
| 2009/0212761 A1 | 8/2009 | Ohta et al. | |

FOREIGN PATENT DOCUMENTS

| | | |
|---|---|---|
| CN | 200976499 Y | 11/2007 |
| JP | 06-062568 | 3/1994 |
| JP | 10-084627 | 3/1998 |
| JP | 10-285818 | 10/1998 |
| JP | 11-252918 | 9/1999 |
| JP | 2000-014031 | 1/2000 |
| JP | 2001-174882 | 6/2001 |
| WO | 2007-064110 | 6/2007 |

OTHER PUBLICATIONS

Thounthong et al., "Utilizing fuel cell and supercapacitors for automotive hybrid electrical system," Applied Power Electronics Conference and Exposition, 2005. APEC 2005. Twentieth Annual IEEE , vol. 1, No. pp. 90-96 vol. 1, Mar. 6-10, 2005.*

(Continued)

*Primary Examiner* — Daniel Cavallari
(74) *Attorney, Agent, or Firm* — David B. Kelley; Brooks Kushman P.C.

(57) ABSTRACT

A power system for an automotive vehicle includes a plurality of power storage units, a multiplexer electrically connected with the power storage units, and a switching converter electrically connected with the multiplexer. The switching converter is configured to selectively act as a flyback switchmode power converter or a forward switchmode power converter.

17 Claims, 7 Drawing Sheets

(56) References Cited

OTHER PUBLICATIONS

Chol-Ho Kim et al., Charge Equalization Converter with Parallel Primary Winding for Series Connected Lithium-Ion Battery Strings in HEV, WEC2-3, The 7th International Conference on Power Electronics, Oct. 22-26, 2008, EXCO, Daegu, Korea.

Stephen W. Moore, et al., A Review of Cell Equalization Methods for Lithium Ion and Lithium Polymer Battery Systems, 2001-01-0959, Copyright 2001, Society of Automotive Engineers, Inc.

* cited by examiner

AUTOMOTIVE POWER SYSTEM

BACKGROUND

A lithium-ion battery typically includes an anode, cathode and electrolyte. Lithium ions move from the anode to the cathode during discharge and from the cathode to the anode during charge.

Graphite may be used for the anode. A layered oxide (lithium cobalt oxide), polyanion (lithium iron phosphate) or spinel (lithium manganese oxide) may be used for the cathode. Other materials may also be used. Depending on the choice of material for the anode, cathode and electrolyte, the voltage, capacity and life of the lithium-ion battery may change.

SUMMARY

In certain embodiments, a power system for an automotive vehicle includes a plurality of power storage units, a multiplexer electrically connected with the power storage units, and a switching converter electrically connected with the multiplexer. The switching converter is configured to selectively act as a flyback switchmode power converter or a forward switchmode power converter.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
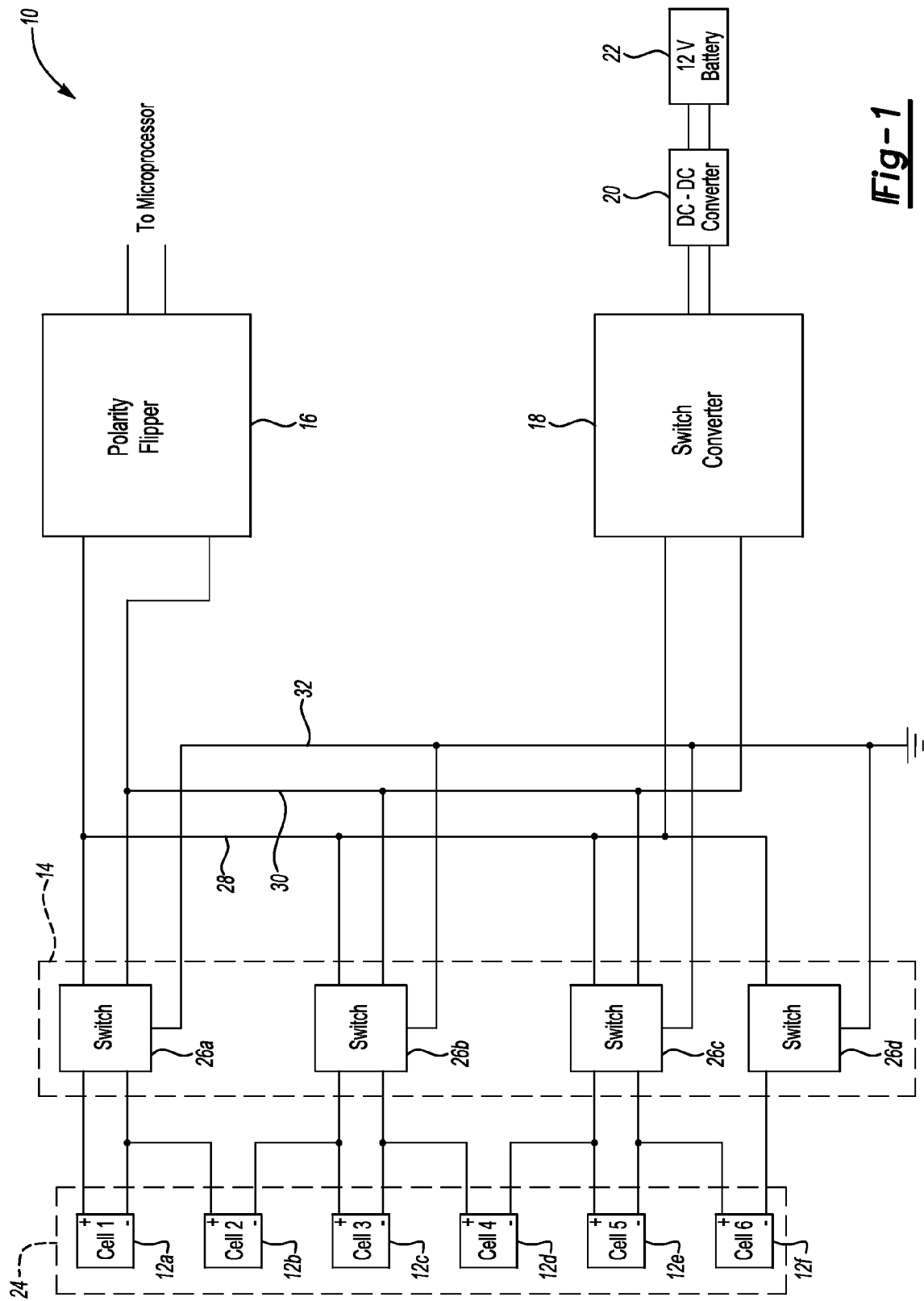
FIG. 1 is a block diagram of an embodiment of an automotive power system.

Referring now to FIG. 1, an embodiment of an automotive power system 10 may include a plurality of power storage units 12n (12a-12f), e.g., six 3.6 V lithium-ion batteries (of course, any suitable number may be used), a high voltage multiplexer 14, a polarity flipper 16 and a switch converter 18. The power system 10 may further include a DC/DC power converter 20 and a low voltage battery 22, e.g., 12 V lead-acid battery.

The power storage units 12n of FIG. 1 are electrically connected in series and form a traction battery pack 24. As apparent to those of ordinary skill, power from the traction battery pack 24 may be used to generate motive power, via an electric machine, to move a vehicle. Such use of the traction battery pack 24 may result in charge imbalances among the power storage units 12n.

The power storage units 12n are electrically connected with the high voltage multiplexer 14. In the embodiment of FIG. 1, the high voltage multiplexer 14 includes a plurality of switches 26n (26a-26d). Each of the switches 26n is electrically connected with at least one of the power storage units 12n. For example, the switch 26a is electrically connected with the power storage units 12a, 12b. The switch 26b is electrically connected with the power storage units 12b, 12c, 12d. Each of the switches 26n is also electrically connected with a first electrical bus 28, a second electrical bus 30 and a ground line 32.

As discussed in more detail below, the switches 26n may be operated such that, for example, a positive terminal of the power storage unit 12a is electrically connected with the first electrical bus 28 and a negative terminal of the power storage unit 12a is electrically connected with the second electrical bus 30. Likewise, the switches 26n may be operated such that a positive terminal of the power storage unit 12b is electrically connected with the second electrical bus 30 and a negative terminal of the power storage unit 12b is electrically connected with the first electrical bus 28, etc.

Figure 2:
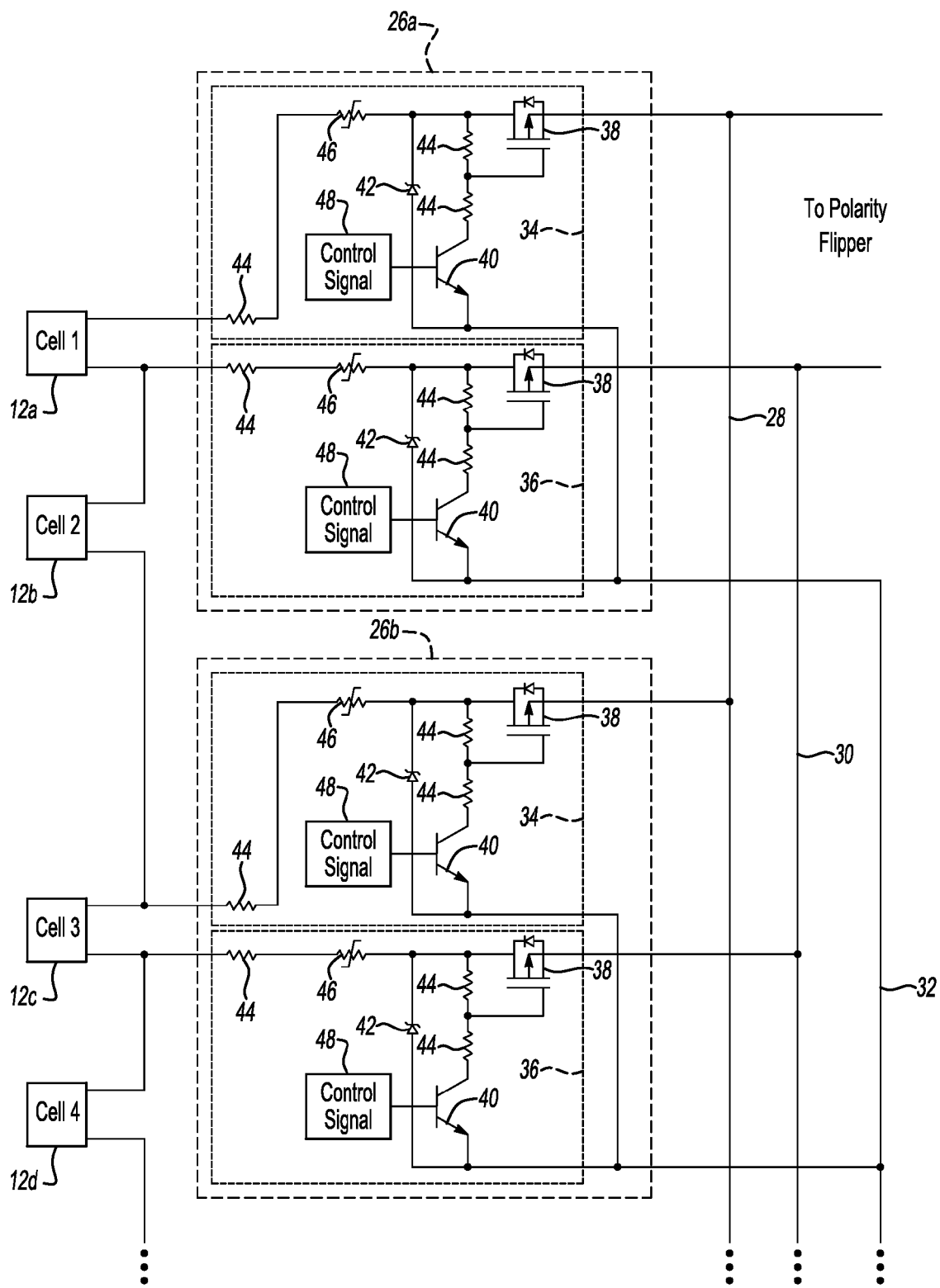
FIG. 2 is a schematic diagram of the multiplexer of FIG. 1.

Referring now to FIG. 2, each of the switches 26n includes first and second switching arrangements 34, 36. As apparent to those of ordinary skill, the switching arrangements 34, 36 each include a field effect transistor (FET) 38, a bi-polar junction transistor (BJT) 40, a Zener diode 42, several resistors 44 and a positive temperature coefficient (PTC) resettable fuse 46 arranged and operated in a known fashion. Other suitable switching arrangements, however, may also be used.

To electrically connect the power storage unit 12a with the electrical buses 28, 30, control signals 48 may be provided to the switching arrangements 34, 36 of switch 26a in a known manner. This, of course, activates their respective FETs 38 and BJTs 40 and electrically connects the positive terminal of the power storage unit 12a with the first electrical bus 28 and the negative terminal of the power storage unit 12a with the second electrical bus 30. To electrically connect the power storage unit 12b with the electrical buses 28, 30, control signals 48 may be provided to the switching arrangement 36 of the switch 26a and the switching arrangement 34 of the switch 26b in a known manner. This activates their respective FETSs 38 and BJTs 40 and electrically connects the positive terminal of the power storage unit 12b with the second electrical bus 30 and the negative terminal of the power storage unit 12b with the first electrical bus 28. (The other power storage units 12c-12f may be similarly electrically connected with the electrical buses 28, 30.) The polarity associated with the electrical buses 28, 30 may thus change depending on which terminals of the power storage units 12n are electrically connected with the electrical buses 28, 30.

Figure 3:
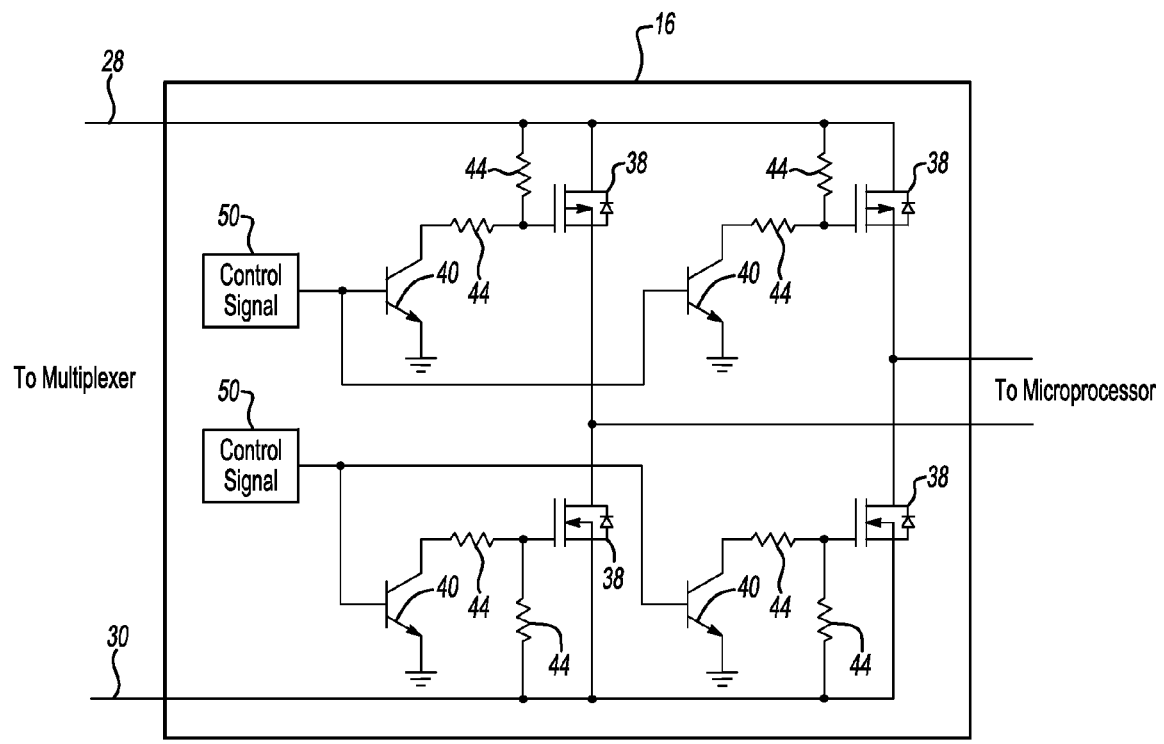
FIG. 3 is a schematic diagram of the polarity flipper of FIG. 1.

Referring now to FIGS. 1 and 3, the polarity flipper 16 is electrically connected with the electrical buses 28, 30. The polarity flipper 16, in the embodiment of FIG. 3, includes a plurality of FETs, BJTs and resistors 38, 40, 44 arranged and operated in a known fashion. Any suitable circuit configuration, however, may be used. As apparent to those of ordinary skill, the polarity flipper 16 may receive an input from the electrical buses 28, 30 having a certain polarity and provide an output of opposite polarity through suitable application of control signals 50. (The polarity flipper 16 may also, of course, receive an input from the electrical buses 28, 30 having a certain polarity and provide an output of the same polarity through suitable application of control signals 50.) This output may then be amplified and provided to a microprocessor for processing.

Figure 4:
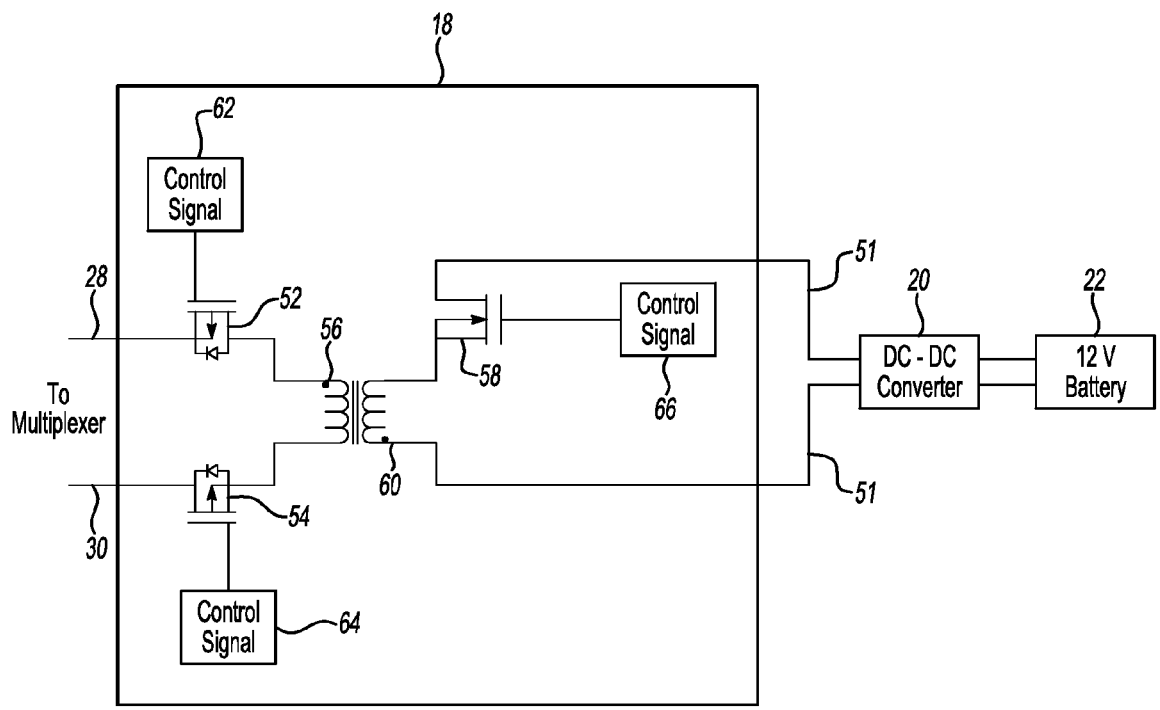
FIG. 4 is a schematic diagram of the switch converter of FIG. 1.
Figure 5:
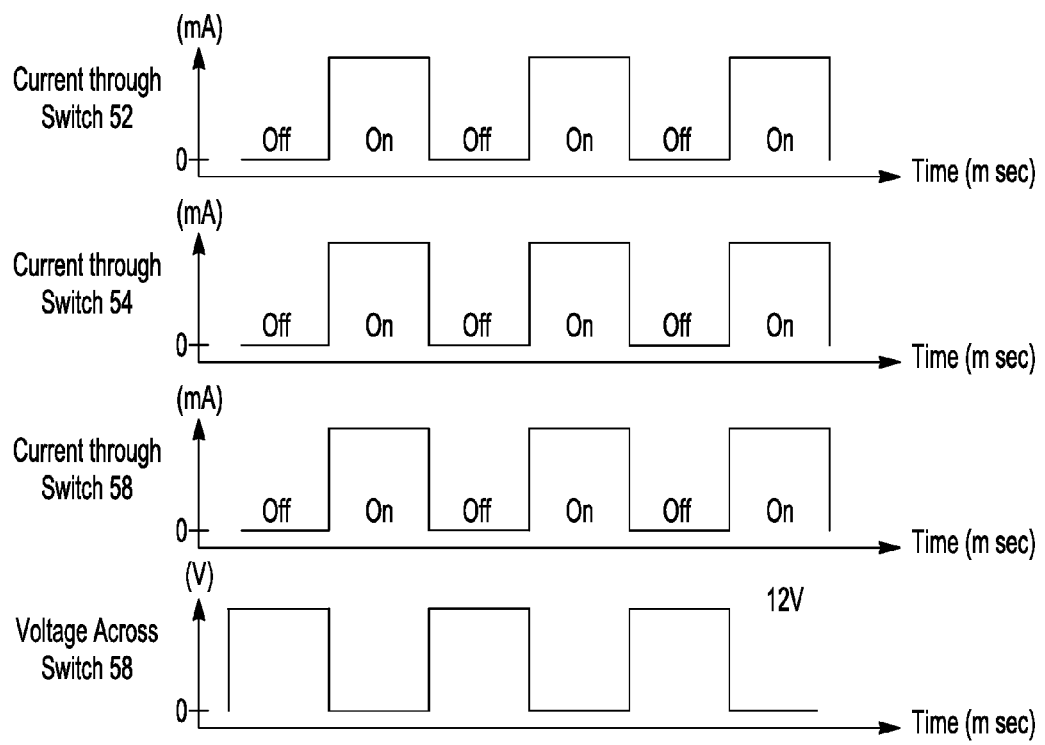
FIG. 5 is an example plot of current and voltage waveforms for the switch converter of FIG. 4.
Figure 6A:
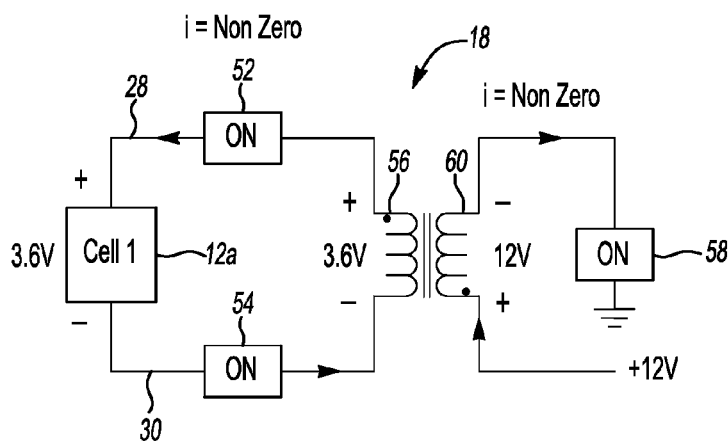
FIGS. 6A and 6B are block diagrams of the switch converter of FIG. 4 operating under the conditions illustrated in FIG. 5.
Figure 6B:
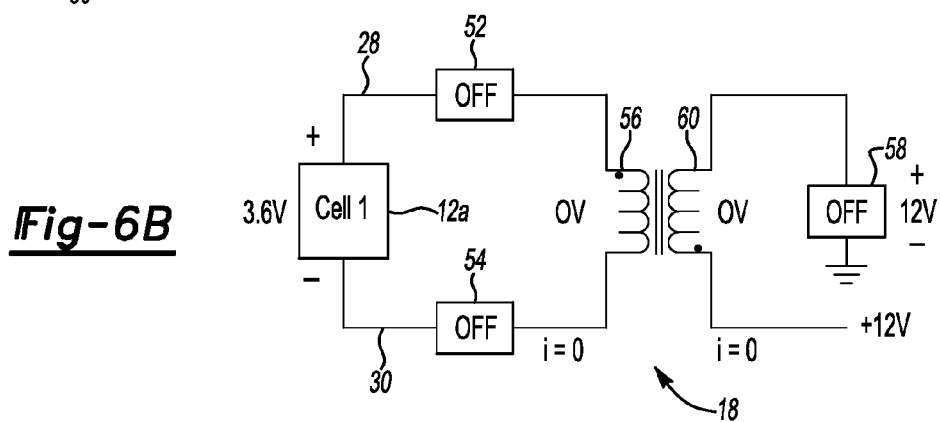
Figure 7:
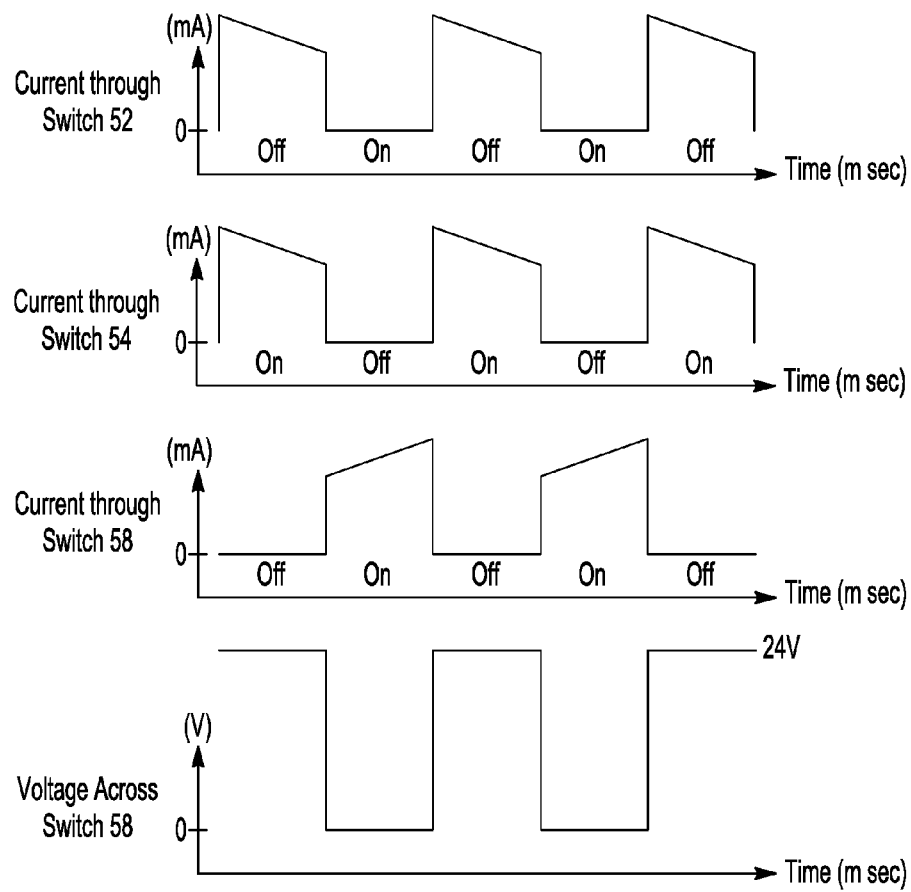
FIG. 7 is another example plot of current and voltage waveforms for the switch converter of FIG. 4.
Figure 8A:
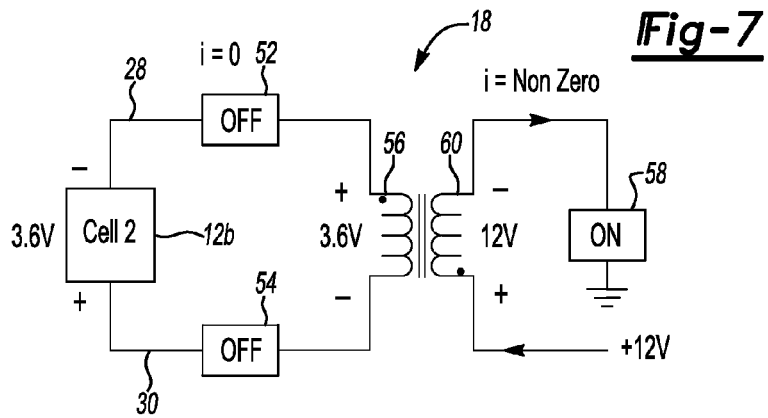
FIGS. 8A and 8B are block diagrams of the switch converter of FIG. 4 operating under the conditions illustrated in FIG. 7.
Figure 8B:
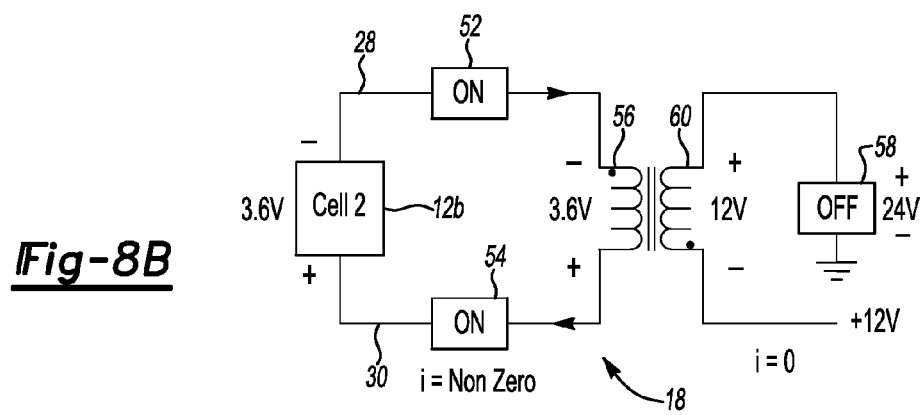
Figure 9:
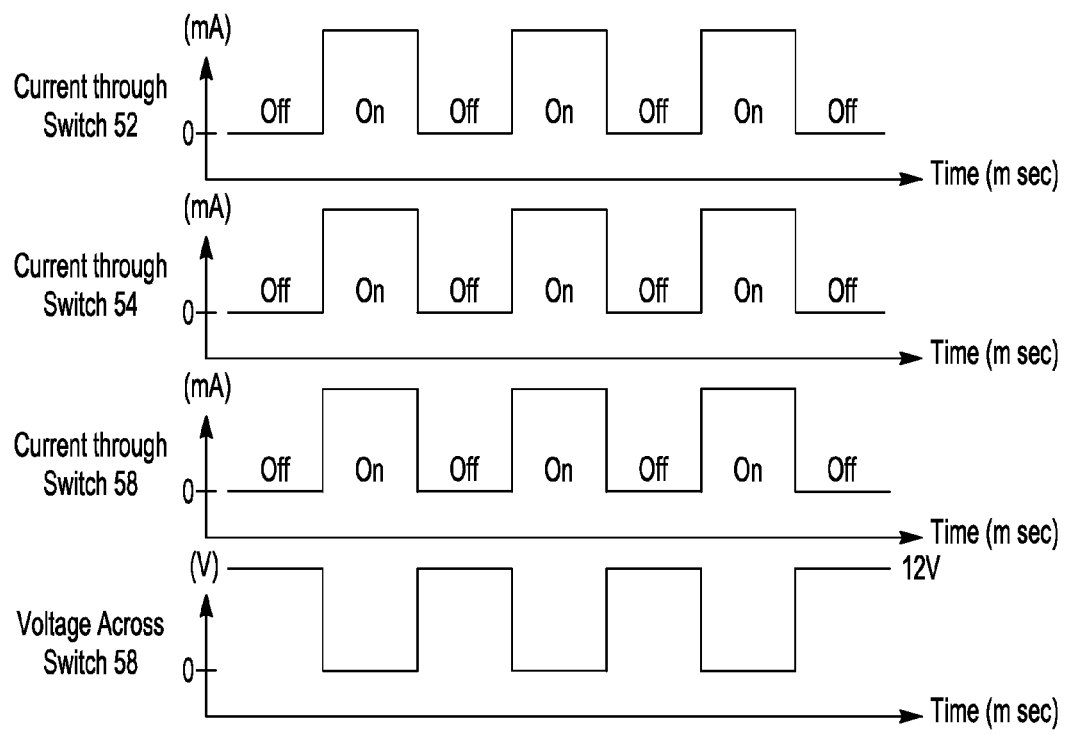
FIG. 9 is yet another example plot of current and voltage waveforms for the switch converter of FIG. 4.
Figure 10A:
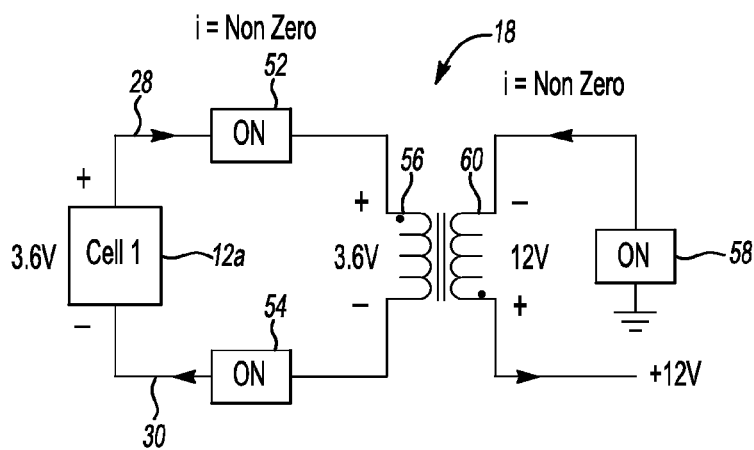
FIGS. 10A and 10B are block diagrams of the switch converter of FIG. 4 operating under the conditions illustrated in FIG. 9.
Figure 10B:
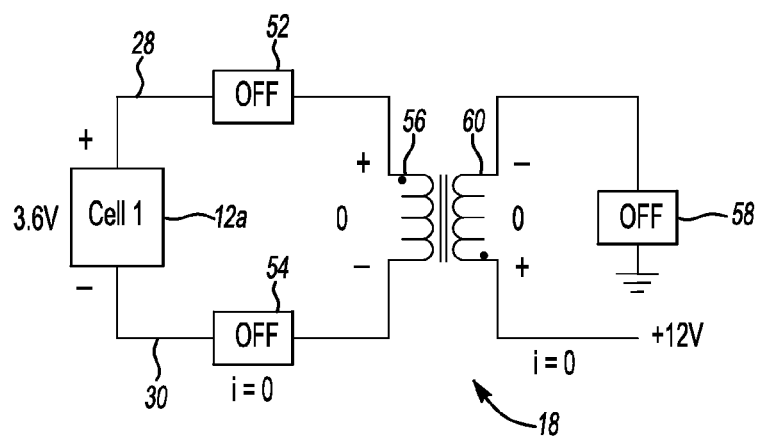
Figure 11:
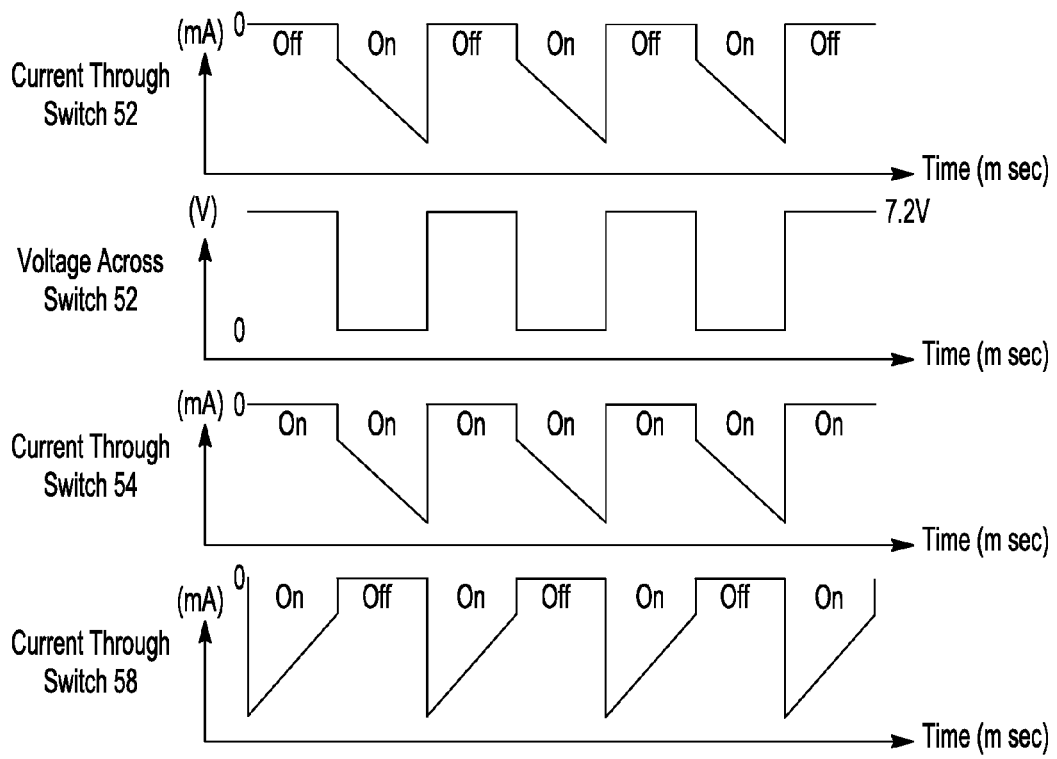
FIG. 11 is still yet another example plot of current and voltage waveforms for the switch converter of FIG. 4.
Figure 12A:
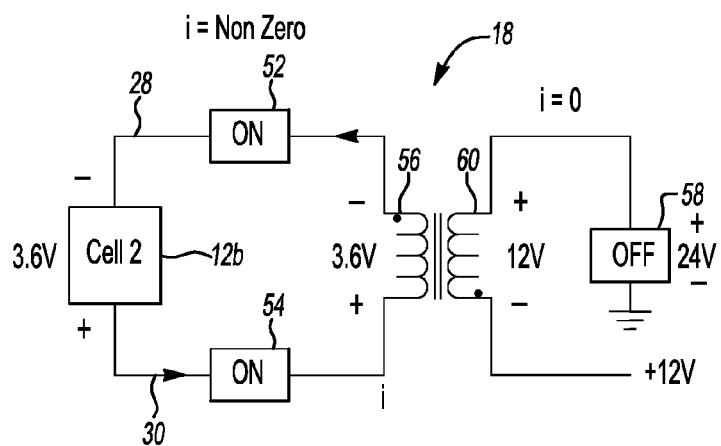
FIGS. 12A and 12B are block diagrams of the switch converter of FIG. 4 operating under the conditions illustrated in FIG. 11.
Figure 12B:
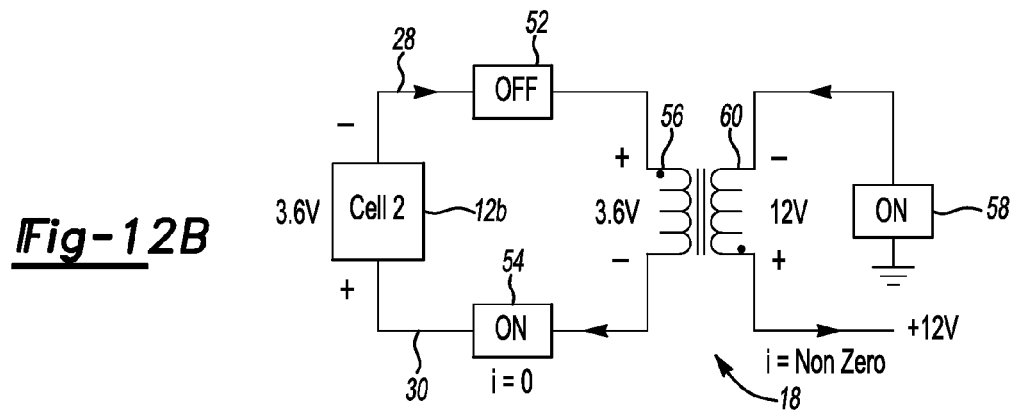

Referring now to FIGS. 1 and 4, the switch converter 18 is electrically connected with the multiplexer 14 via the electrical buses 28, 30. The switch converter 18 is also electrically connected with the DC/DC converter 20 via a third electrical bus 51.

In the embodiment of FIG. 4, the switch converter 18 includes switches 52, 54, e.g., FETs, electrically connected with the electrical buses 28, 30 respectively. A coil 56 is electrically connected between the switches 52, 54. The switch converter 18 also includes a switch 58, e.g., FET, electrically connected with the DC/DC converter 20 and a coil 60 inductively coupled with the coil 56. The turns ratio of the coils 56, 60 is 1:3.33 in the embodiment of FIG. 4. Other suitable circuit configurations may also be used. Through appropriate activation of switches 52, 54, 58 via control signals 62, 64, 66 respectively, the switch converter 18 may act as a forward or fly back converter to pass electrical power between, for example, the low voltage battery 22 and the traction battery pack 24.

Referring now to FIGS. 4, 5, 6A and 6B, the switches 52, 54, 58 may be turned on and off in phase to operate the switch converter 18 as a forward converter to charge, for example, the power storage unit 12a with power from the low voltage battery 22. When the switches 52, 54, 56 are on, 12 V appears across the coil 60, which drives 3.6 V of opposite polarity across the coil 56 (because of the turns ratio of the coils 56, 60 and the placement of the dots). Current (as indicated by arrow in FIG. 6A) then flows clockwise on the low voltage battery side of the converter 18 and counter-clockwise on the multiplexer side of the switch converter 18 to charge the power storage unit 12a. When the switches 52, 54, 58 are off, 12 V appears across the switch 58, 0 V across the coils 56, 60 and no current flows to the power storage unit 12a.

Referring now to FIGS. 4, 7, 8A and 8B, the switches 52, 54 may be turned on and off out of phase relative to the switch 58 to operate the switch converter 18 as a fly back converter to charge, for example, the power storage unit 12b with power from the low voltage battery 22. When the switches 52, 54 are off, the switch 58 is on. 12V appears across the coil 60, which increases the current in the coil 60. Current (as indicated by arrow in FIG. 8A) then flows clockwise on the low voltage battery side of the switch converter 18. When the switches 52, 54 are on, the switch 58 is off. 3.6 V appears across the coil 56, which drives 12 V of opposite polarity across the coil 60. 24 V appears across the switch 58. Current (as indicated by arrow in FIG. 8B) then flows clockwise on the multiplexer side of the switch converter 18 to charge the power storage unit 12b.

Referring now to FIGS. 4, 9, 10A and 10B, the switches 52, 54, 58 may be turned on and off in phase to operate the switch converter 18 as a forward converter to charge, for example, the low voltage battery 22 with power from the power storage unit 12a. When the switches 52, 54, 58 are on, 3.6 V appears across the coil 56, which drives 12 V of opposite polarity across the coil 60 (because of the turns ratio of the coils 56, 60 and the placement of the dots). Current (as indicated by arrow in FIG. 10A) then flows clockwise on the multiplexer side of the switch converter 18 and counter-clockwise on the low voltage battery side of the converter 18 to charge the low voltage battery 22 via the third electrical bus 51 and DC/DC converter illustrated in FIG. 1. When the switches 52, 54, 56 are off, 12 V appears across the switch 58, 0 V across the coils 56, 60 and no current flows to the low voltage battery 22.

Referring now to FIGS. 4, 11, 12A and 12B, the switch 52 may be turned on and off out of phase relative to the switch 58, while switch 54 is on, to operate the switch converter 18 as a fly back converter to charge, for example, the low voltage battery 22 with power from the power storage unit 12b. When the switches 52, 54 are on, the switch 58 is off. 3.6 V appears across the coil 56, which increases the current in the coil 56. 24 V appears across the switch 58. Current (as indicated by arrow in FIG. 12A) flows counter-clockwise on the multiplexer side of the switch converter 18. When the switch 52 is off, the switches 54, 58 are on. 12V appears across the coil 60, which drives 3.6 V of opposite polarity across the coil 56. Current (as indicated by arrow in FIG. 12B) then flows counter-clockwise on the low voltage battery side of the switch converter 18 to charge the low voltage battery 22.

Referring again to FIG. 1, charge imbalances among the power storage units 12n may thus be corrected using the techniques described above. For example, power from the power storage unit 12a may be discharged to the low voltage battery 22 using the techniques described with reference to FIGS. 9, 10A and 10B if the state of charge of the power storage unit 12a is found to be greater than a desired state of charge. Likewise, power from the low voltage battery 22 may be discharged to the power storage unit 12a using the techniques described with reference to FIGS. 5, 6A and 6B if the state of charge of the power storage unit 12a is found to be less than the desired state of charge. Other charging/discharging scenarios are also possible.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A power system for an automotive vehicle comprising:
a plurality of power storage units;
a multiplexer electrically connected with the power storage units; and
a switching converter electrically connected with the multiplexer and configured to selectively operate in a flyback mode or a forward mode.

2. The system of claim 1 wherein the switching converter comprises a bi-directional switching converter.

3. The system of claim 1 wherein the switching converter accommodates either input polarity.

4. The system of claim 1 wherein the switching converter is configured to receive voltages of either polarity.

5. The system of claim 1 wherein the switching converter is configured to present voltages of either polarity.

6. The system of claim 1 wherein the switching converter is capable of receiving a DC voltage having a first polarity or a second polarity opposite the first polarity.

7. The system of claim 1 wherein the switching converter is capable of presenting a DC voltage having a first polarity or a second polarity opposite the first polarity.

8. The system of claim 1 wherein the multiplexer is a bi-directional multiplexer.

9. The system of claim 1 further comprising a power bus electrically connected with the switching converter, wherein the switching converter is further configured to pass power between a selected one of the power storage units and the power bus.

10. A switching converter for an automotive power system including a multiplexer, the converter comprising:
   circuitry electrically connected with the multiplexer and configured to selectively operate in a flyback mode or a forward mode.

11. The converter of claim 10 wherein the circuitry is further configured to receive voltages of either polarity from the multiplexer.

12. The converter of claim 10 wherein the circuitry is further configured to present voltages of either polarity to the multiplexer.

13. The converter of claim 10 wherein the circuitry is further configured to receive a DC voltage having a first polarity or a second polarity opposite the first polarity.

14. The converter of claim 10 wherein the circuitry is further configured to present a DC voltage having a first polarity or a second polarity opposite the first polarity.

15. The converter of claim 10 wherein the power system further includes a plurality of power storage units electrically connected with the multiplexer and a power bus electrically connected with the switching converter, and wherein the circuitry is further configured to pass power between a selected one of the power storage units and the power bus.

16. A power system for an automotive vehicle comprising:
   a plurality of power storage units;
   a multiplexer electrically connected with the power storage units; and
   a switching converter electrically connected with the multiplexer and configured to (i) selectively operate in a flyback mode or a forward mode and (ii) receive or present a DC voltage of either polarity to the multiplexer.

17. The system of claim 16 further comprising a power bus electrically connected with the switching converter, wherein the switching converter is further configured to pass power between a selected one of the power storage units and the power bus.

* * * * *